United States Patent
Beezer et al.

(10) Patent No.: US 6,986,103 B1
(45) Date of Patent: Jan. 10, 2006

(54) DOCUMENT FORMATTING BASED ON OPTIMIZED FORMATTING VALUES

(75) Inventors: John L. Beezer, Redmond, WA (US); Michael J. Duggan, Kirkland, WA (US); Jerry J. Dunietz, Seattle, WA (US); William Hill, Carnation, WA (US); David M. Silver, Redmond, WA (US); Geraldine G. Wade, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/456,150

(22) Filed: Dec. 7, 1999

(51) Int. Cl.
*G06F 17/00* (2006.01)

(52) U.S. Cl. .................... 715/523; 715/522; 715/524

(58) Field of Classification Search ............... 715/517, 715/520, 523, 526, 529, 542, 788, 864, 776, 715/522, 524; 345/467, 788, 864, 866, 776
See application file for complete search history.

(56) References Cited

U.S. PATENT DOCUMENTS

| | | | |
|---|---|---|---|
| 5,263,132 A * | 11/1993 | Parker et al. ............... | 715/542 |
| 5,475,399 A * | 12/1995 | Borsuk ....................... | 345/472 |
| 5,953,733 A * | 9/1999 | Langford-Wilson ......... | 715/517 |
| 6,144,974 A * | 11/2000 | Gartland ..................... | 715/517 |
| 6,389,437 B2 * | 5/2002 | Stoub ......................... | 715/523 |
| 6,486,862 B1 * | 11/2002 | Jacobsen et al. ............. | 345/88 |
| 6,493,734 B1 * | 12/2002 | Sachs et al. ................ | 715/526 |
| 6,504,544 B1 * | 1/2003 | Hollingsworth et al. .... | 345/467 |
| 6,547,830 B1 * | 4/2003 | Mercer ....................... | 715/518 |
| 6,564,250 B1 * | 5/2003 | Nguyen ...................... | 709/208 |
| 6,584,479 B2 * | 6/2003 | Chang et al. ............... | 715/512 |
| 6,717,686 B1 * | 4/2004 | Farros et al. ............... | 358/1.1 |

OTHER PUBLICATIONS

Microsoft Corporation, Microsoft Word 6.0 User's Guide (1994), pp. 113-115 and 142-144.*
SOFTBOOK™ Press The Leader in Internet-Enabled Document Distribution and Reading Systems; http://www.softbook.com/consumer/reader.asp; Oct. 1999, pp. 1-3.
Rocket eBook Technical Details; http://www.rocketbook.com/Products/Faq/using.html, Oct. 1999, pp. 1-4.
Rocket eBook Using the Rocket eBook; http://www.rocketbook.com/Products/Faq/using.html, Oct. 1999, pp. 1-2.
Explore Features of the Rocket eBook; wysiwyg://212http://www.rocketbook.com/Products/Tour/index.html, Oct. 1999, pp. 1-3.

* cited by examiner

*Primary Examiner*—Sanjiv Shah
(74) *Attorney, Agent, or Firm*—Banner & Witcoff, Ltd.

(57) ABSTRACT

At least a portion of a plurality of formatting variables associated with an electronic document are modified based in part upon optimized formatting values. A user may specify values for one or more user-modifiable formatting variables. Based on the user data thus specified, at least a portion of the plurality of formatting variables are modified according to corresponding optimized formatting values. The electronic document is then formatted in accordance with the modified formatting variables and provided for display. The user-modifiable variables may comprise a font reference variable and/or a display form factor variable. In this manner, the present invention optimizes readability of electronic documents while still accommodating user preferences for displaying such documents.

23 Claims, 5 Drawing Sheets

DOCUMENT FORMATTING BASED ON OPTIMIZED FORMATTING VALUES

TECHNICAL FIELD

The present invention relates generally to display of electronic documents and, in particular, to a technique for formatting a document based on optimized formatting values.

BACKGROUND OF THE INVENTION

Printed books have been in existence for hundreds of years. So-called electronic books are also known in the art and are increasingly becoming a part of ordinary life. In an electronic book, documents are presented to a reader using a computer-based display device. Examples of such devices are the "ROCKET EBOOK" device by NuvoMedia, Inc. and the "SOFTBOOK READER" device by Softbook Press, Inc. Some in the industry believe that electronic books will someday become a substitute for printed books. Given current trends, it appears that electronic books will, at the very least, become a common alternative to printed books in the near future.

The potential success of electronic books is largely dependent upon their ability to replicate the success of printed books as an information delivery system. It is important to recognize that printed books are, in fact, a system for delivering information. Printed books are effective in part because, when well crafted, they resonate with the human ability to visually recognize patterns. Typographers and printers have long understood that books work best as sources of information when a reader's processing of the printed words becomes essentially unconscious, leaving the reader's conscious cognitive processing available to more efficiently process content and meaning.

Stated another way, a well-formed book is one that allows a reader to become immersed in the author's content and imagery, without being conscious of the fact that they are actually reading a book.

To facilitate such immersive reading experiences, the form and formatting of printed documents becomes crucial. Well-formed printed matter depends upon the coordination of a variety of variables that individually seem trivial but, when combined for an overall effect, greatly influence a reader's ability to become immersed in reading. Examples of such variables include the type face and size, letter and word spacings, line length, size of margins, leading (i.e., the amount of space between printed lines), indentation, justification, hyphenation and language. Since the inception of printed matter, such variables, taken together as a complete system, have been refined and optimized. For example, Table 1 below illustrates one interpretation of cause and effect relationships between various formatting variables. In particular, Table 1 illustrates how changes to variables along the vertical axis have an effect (represented by boxes having a "yes" therein) on those variables along the horizontal axis.

TABLE 1

|  | Font Face | Font Size | Headings | Indents | Leading | Line Length | Justif. | Pagination | T/B Margins |
|---|---|---|---|---|---|---|---|---|---|
| Font Face | Yes | Yes | Yes | Yes | Yes | — | — | Yes | Yes |
| Font Size | — | Yes | Yes | Yes | Yes | Yes | Yes | Yes | Yes |
| Headings | — | Yes | Yes | Yes | Yes |  | Yes | — | — |
| Indents | — | — | — | Yes | — | Yes | Yes | — | — |
| Rotation | — | — | — | Yes | — | Yes | — | Yes | Yes |
| Form Factor | Yes | Yes | Yes | Yes | — | Yes | Yes | Yes | Yes |

However, to date, systems for displaying electronic documents have generally not adhered to the principle that formatting variables are interrelated. Ironically, many computer-based document authoring/displaying mechanisms have been more concerned with optimizing content for printed display, rather than electronic display, because, until recently, the electronic display of documents has not been viewed as an end itself but merely as a means to more effectively produce printed matter.

Additionally, the capability to quickly alter formatting variables in electronic documents has not necessarily improved the readability of electronic documents, and in many cases seriously detracts from readability. An example of this would be when a user resizes a typical Web browser so that it occupies the entire display of a desktop or laptop computer. In many Web document implementations, this immediately results in a line length for the main text of the document which is uncomfortable to read because it requires excessive head and eye movement to take in the full lines of text. That is, a problem with many platforms currently used to display electronic documents is that they allow certain formatting variables to be changed without necessarily optimizing the other formatting variables as a result. For example, in some word processing applications, one can increase or decrease the size of the font used. In response, the word processing software will increase the amount of leading. While this may be appropriate in some cases, it still ignores the typographic principle that other formatting variables should also be altered in light of the change to the font size in order to optimize readability of the document. Similar deficiencies exist in other platforms. For example, in the "ROCKET EBOOK" device, the capability exists to adjust font size between a large and small setting. However, changing this variable does not appear to result in the other formatting variables being changed to optimally cooperate with the new font size. The effect of this failure to optimize formatting variables is the likely degradation of the overall readability of the electronic document.

Some efforts have been made to address these shortcomings. For example, a system is disclosed in U.S. patent application Ser. No. 08/847,427 entitled METHOD AND SYSTEM FOR DYNAMICALLY ADAPTING THE LAYOUT OF A DOCUMENT TO AN OUTPUT DEVICE in which the particular display characteristics of a given display device are used to dictate, in part, the formatting of an electronic document. While the system disclosed in that patent application represents a significant advance in the art, a need exists for a system in which changes to one or more formatting variable result in the optimized modification of remaining formatting variables.

SUMMARY OF THE INVENTION

The present invention provides a technique for modifying formatting variables in an electronic document based in part upon optimized formatting values. To this end, a user may specify values for one or more user-modifiable formatting variables of a plurality of formatting variables.

Based on the user data thus specified, at least a portion of the plurality of formatting variables are modified according to corresponding optimized formatting values. The electronic document is then formatted in accordance with the modified formatting variables and provided for display. In a preferred embodiment, the user-modifiable variables comprise a font reference variable (e.g., selecting a small font or a large font) and/or a display form factor variable. In this manner, the present invention allows for user preferences in displaying electronic documents, and yet optimizes readability of such documents despite changes to formatting variables resulting from user preferences.

DETAILED DESCRIPTION OF THE INVENTION

Figure 1:
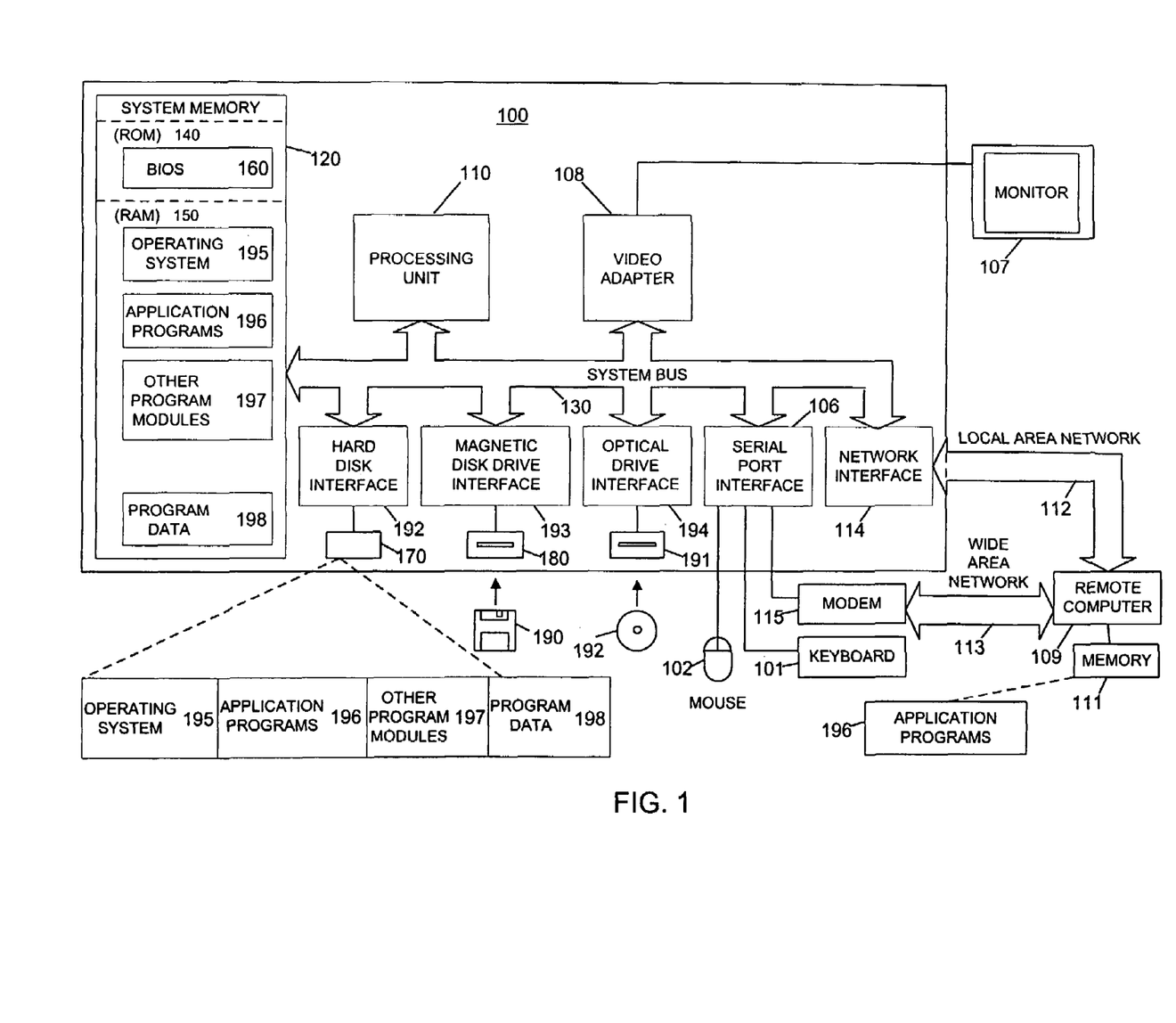
FIG. 1 is a schematic block diagram of a conventional general-purpose digital computing environment that may be used to implement various aspects of the present invention.

The present invention may be more fully described with reference to FIGS. 1–6. FIG. 1 is a schematic diagram of a conventional general-purpose digital-computing environment (including handheld computing devices) that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment. It is anticipated that a handheld device implementing this invention would typically have only one mass storage peripheral, either a micro hard disk or else flash memory or equivalent.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers. Preferably, any implementation of the present invention is designed to be operable in a least case scenario only by touch, and does not always require the use of a keyboard or mouse.

Computer 100 can operate in a networked environment using logical connections to one or more remote computers, such as a remote computer 109. Remote computer 109 typically includes at least some of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet. It is anticipated that a handheld device used to implement the present invention would typically use a wireless LAN interface based on an infra-red or radio frequency communication link.

When used in a LAN networking environment, computer 100 is connected to local network 112 through a network interface or adapter 114. When used in a WAN networking environment, personal computer 100 and remote computer 109 may both include a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. For example, in an embodiment of the present invention, the remote computer 109 is a server having stored thereon one or more documents that may be accessed by the computer 100.

Figure 2:
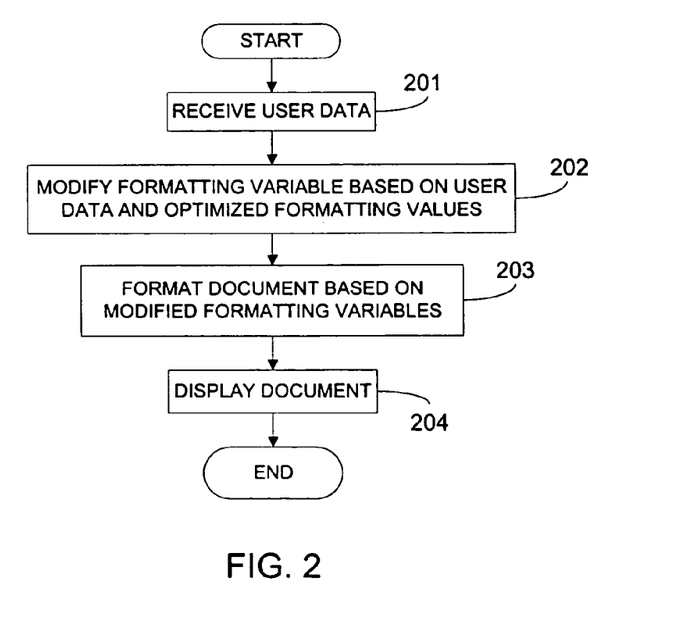
FIG. 2 is a flowchart illustrating a method for formatting a document in accordance with the present invention.

Referring now to FIG. 2, a method in accordance with the present invention is further illustrated. The method illustrated in FIG. 2 is preferably implemented using stored, computer-executable instructions executed by a suitable processor. At step 201, user data corresponding to at least one user-modifiable formatting variable, relative to a given document, is received. Such user data may be received when a document is being initially displayed, or at any subsequent point in time during display of the document. Any suitable technique for receiving data from a user of a computer-based device may used to receive the user data. For example, any of the user input or selection devices described above may be used. In a preferred embodiment, two possible user-modifiable formatting variables are available: a font reference variable and a display form factor variable. When a display form factor variable is being modified, the required user data may be stored (e.g., in ROM, RAM or other memory device) in a list or index of device capabilities of the device in which the method of FIG. 2 is being implemented. Thus, when a particular document is to be initially displayed, the list of stored device capabilities may be referenced to ascertain the particular value of the display form factor variable. Various exemplary values for the display form factor variable are listed below in Tables 2 and 3 below under the heading of 'Resolution'.

The font reference variable specifies one of a number of possible generalized text settings that may be used to display a document's content. For example, a user may choose to display the document using a "small" or "large" text display mode. Tables 2 and 3 illustrate optimized formatting values used when the font reference is chosen as either "small" or "large", respectively. In a preferred embodiment, any user-modifiable formatting variable may take on only one of a predetermined set of variable values. Thus, for example, the font reference variable may only be designated as "small" or "large" in the preferred embodiment. Of course, the size of the predetermined set of variable values for a given user-modifiable formatting variable is a matter of design choice, and the present invention is not limited in that regard.

At step 202, at least a portion of formatting variables used to control formatting of the document are modified in accordance with the user data (received at step 201) and optimized formatting variables. That is, depending on the value assigned to at least one user-modifiable formatting variable, optimized formatting variables will be ascertained and used to modify the values of at least a portion of the formatting variables used to control formatting of the document. Tables 2 and 3 below illustrate exemplary optimized formatting variables. In particular, Table 2 shows exemplary values based on the font reference variable having a value of "small" and further assuming a portrait orientation of the display device used to display the document.

TABLE 2

(Small, Portrait)

| | Resolution (Width x Height) | | | |
|---|---|---|---|---|
| | 240 x 320 | 1600 x 1024 1280 x 1024 | 1024 x 768 | 800 x 600 |
| Display Area | 240 x 320 | 576 x 768 | 522 x 696 | 402 x 536 |
| Font | Frutiger Linotype | Berling | Berling | Berling |
| Serif | No | Yes | Yes | Yes |
| Size | 10 | 14 | 13 | 12 |
| Justification | Yes | Yes | Yes | Yes |
| Hyphenation | Yes | Yes | Yes | Yes |
| Margin Right | 8% | 8% | 8% | 8% |
| Margin Top | 12% | 12% | 12% | 12% |
| Margin Bottom | 9% | 9% | 9% | 9% |
| Margin Left | 8% | 8% | 8% | 8% |
| Leading | 120% | 120% | 115% | 120% |

Thus, it is possible to determine the values for the various formatting variables in response to a user selecting the "small" display mode. For example, where the display device's resolution is 240×320 (typical for a handheld device), a 10-point, san serif Frutiger Linotype font is used with 120% leading. However, where the display device's resolution is 1024×768 (typical for desktop computer), a 13-point, Berling font with serifs is used with 115% leading. Serifs and leading are described in further detail below with regard to FIGS. 4–7. Table 3 shows exemplary values based on the font reference variable having a value of "large" and further assuming a portrait orientation of the display device used to display the document. Although device resolution and display area are expressed in pixels in Table 2 above and Table 3 below, this is done so on devices typical today in which the range of resolutions remains fairly narrow. However, in the future, such decisions will be driven by both resolution and absolute measurements of the screen (e.g inches or millimeters).

TABLE 3

(Large, Portrait)

| | Resolution (Width x Height) | | | |
|---|---|---|---|---|
| | 240 x 320 | 1600 x 1024 1280 x 1024 | 1024 x 768 | 800 x 600 |
| Display Area | 240 x 320 | 576 x 768 | 522 x 696 | 402 x 536 |
| Font | Frutiger Linotype | Berling | Berling | Berling |
| Serif | No | Yes | Yes | Yes |
| Size | 14 | 18 | 16 | 14 |
| Justification | No | Yes | Yes | Yes |
| Hyphenation | Yes | Yes | Yes | Yes |
| Margin Right | 8% | 8% | 8% | 8% |
| Margin Top | 12% | 12% | 12% | 12% |
| Margin Bottom | 9% | 9% | 9% | 9% |
| Margin Left | 8% | 8% | 8% | 8% |
| Leading | 120% | 115% | 110% | 120% |

Although similar to the optimized formatting values shown in Table 2, the optimized formatting values corresponding to the "large" font reference value do include several differences. As one would expect, the font sizes are generally as big or bigger than those used for the "small" settings. Furthermore, greater variability in the leading is used. Further still, there exists at least one case in the "large" settings in which it is desirable to turn justification off. One similarity between all cases of the "small" and "large" settings shown is that hyphenation is always turned on. Of course, the specific optimized formatting values to be used in any implementation are a matter of design choice. Those having ordinary skill in the art will be able to derive a variety of such optimized formatting variables. For example, sets of optimized variables may be created assuming a landscape orientation for both "small" and "large" font reference values. It should be further noted that other variables may be used in addition to, or as substitutes for, the particular formatting variables discussed herein as a matter of design choice. For example, particular formatting variables relating to the inclusion of images within a body of text have not been discussed herein. Another possible formatting variable is the language in which a particular document is written; formatting may be very different if a document is to be displayed, for example, in Japanese rather than English. However, the use of such formatting variables is commensurate with the principles of the present invention. Finally, in the preferred embodiment, optimized formatting values, such as those exemplified in Tables 2 and 3, are preferably stored in memory for ready reference by a suitable processing device.

Referring again to FIG. 2, once the formatting variables have been modified based on the appropriate optimized formatting values, the document is formatted in accordance with the modified variables at step 203. Once formatting has been completed, the document may be displayed (or redisplayed, as the case may be) via a display device at step 204. Techniques for formatting and displaying electronic documents according to various formatting variables are well known in the art.

Figure 3:
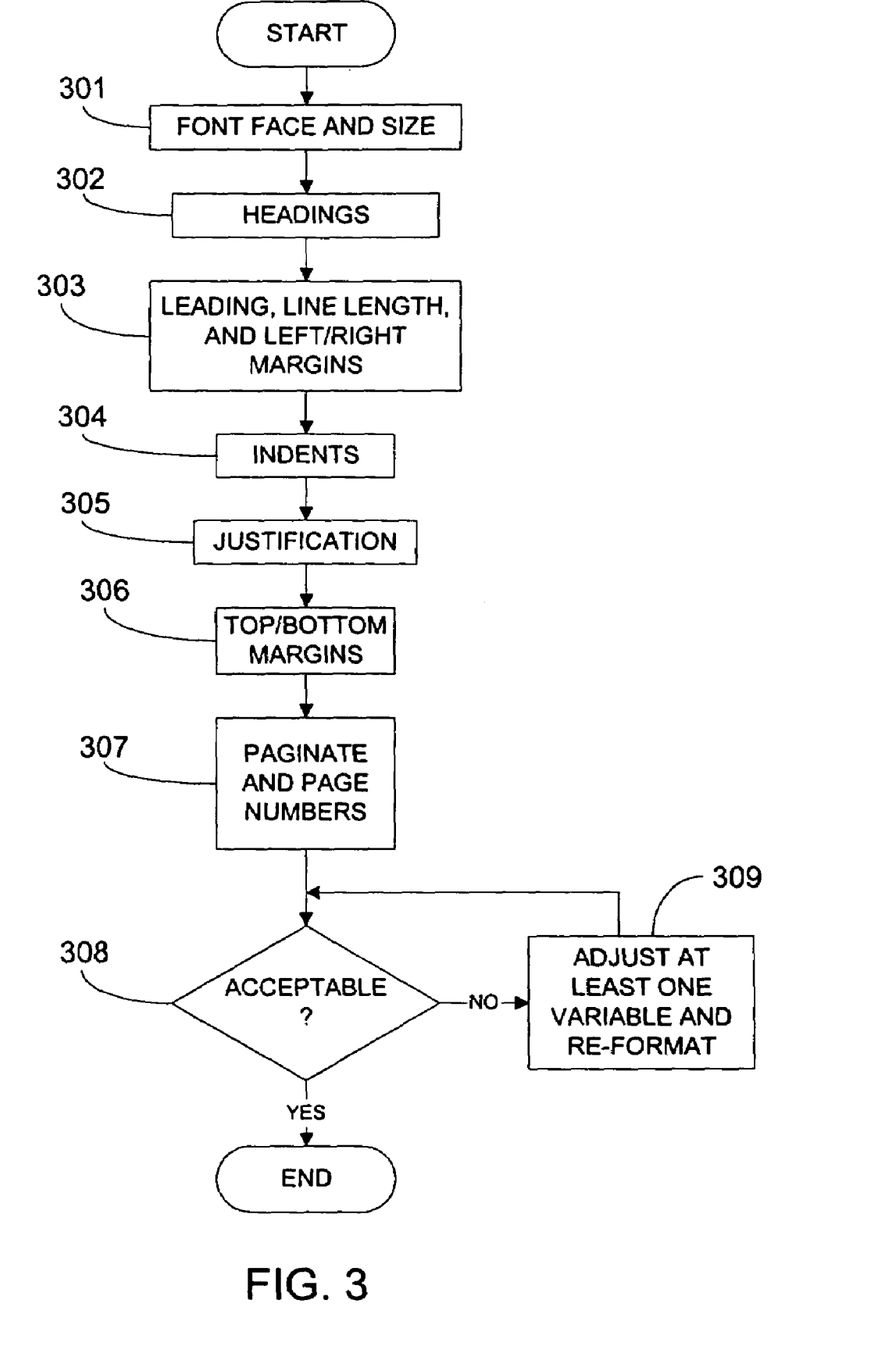
FIG. 3 is a flowchart illustrating in greater detail certain steps of the method illustrated in FIG. 2.

FIG. 3 illustrates in greater detail steps 202 and 203 of FIG. 2. Again, the steps illustrated in FIG. 3 are preferably implemented using stored instructions executed by a suitable processing device. The method shown in FIG. 3 represents a preferred method for effectuating the modification of formatting variables and observing the effect that such changes have on the layout of a document.

Thus, responsive to the receipt of user data for at least one user-modifiable formatting variable, it is determined at step 301 whether any changes are necessitated to the font face or font size as determined by the optimized formatting variables. Similar determinations are made at steps 302–306 whether any changes are required to headings in the text (e.g., chapter headings, section headings, etc.), to the leading, line length and left or right margins, to paragraphs indents, to justification of text and, finally, to top and bottom margins. Once it has been determined which variables need to be modified, the document is formatted to determine page boundaries (paginated) and page numbers are also determined at step 307.

Subsequent to, or during, the process of pagination, it is necessary to determine whether the resulting formatting is acceptable, as represented by step 308. Acceptability in the present context is determined by objectively monitoring the outcome of the formatting process to ascertain whether any typographical problems exist. For example, a formatting scheme that results in an excessive amount of hyphenation may not be acceptable. As another example, the existence of so-called widows (last line of a paragraph printed by itself at the top of a page) and orphans (first line of a paragraph printed by itself at the bottom of a page) may not be acceptable. Those having ordinary skill in the art will recognize that a variety of objective criteria may be used for this purpose.

If the formatting process leads to acceptable results, the processing of FIG. 3 terminates. However, if the formatting does not lead to acceptable results, processing continues at step 309 where at least one variable can be adjusted and the document reformatted in light of this adjustment. The reformatted document is then re-checked for acceptability as described above. The modification of variables at this step may encompass changes to the entire document or, if possible, to certain portions of the document. For example, if a single widow is detected in one chapter or in one paragraph of the document, it may not be advantageous to re-format the entire document after changing, for example, the line length variable. In this case, it may be advantageous to alter that variable only as it applies to that single chapter or paragraph. Again, those having ordinary skill in the art will appreciate that various techniques may be used to ensure acceptable formatting quality in light of a change to a user-modifiable variable.

Figure 4:
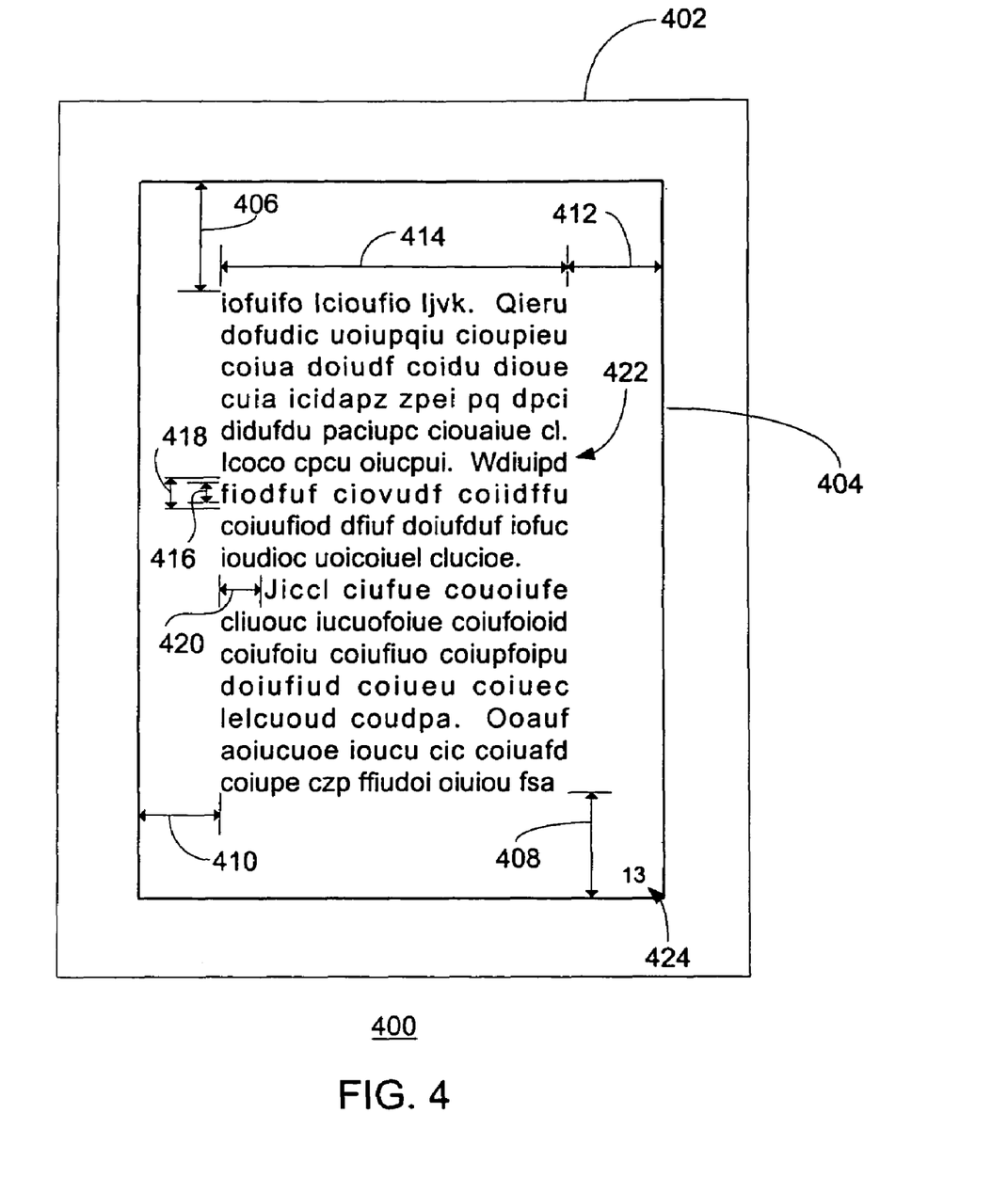
FIG. 4 illustrates formatting variables as applied to a document displayed in a computer-based display in accordance with the present invention.

Examples of the above-described techniques are further illustrated in FIGS. 4–7. Note that the formatting examples shown in FIGS. 4–7 are for illustrative purposes only, and are not intended to be representative of well-formed text. FIG. 4 illustrates a document 422 being displayed on a computer-based device 400. The computer-based device 400 comprises a housing 402 in which a display 404 is located. In the context of the present invention, the display 404 may comprise an entire monitor or screen, or just a portion thereof (e.g., a window within a larger screen area). Details regarding a user interface and/or other user interface input devices are not shown in FIG. 4, although such functionality is presumed. The electronic document 422 is shown within the area of the display 404.

Figure 5A:
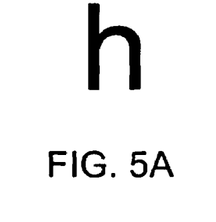
FIGS. 5A and 5B illustrate examples of san serif and serif font faces, respectively.
Figure 5B:
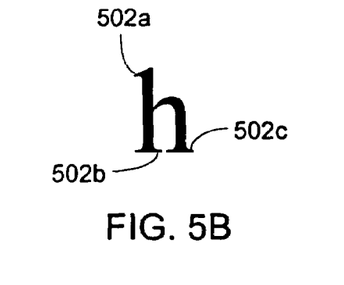

The text illustrated in FIG. 4 is displayed with justification enabled. Justification results in the ends of each line of text being aligned with the left and right margins. As known in the art, some form of hyphenation and/or variable inter-word spacing is typically required in order to fully justify lines of text. Furthermore, the font face shown in FIG. 4 is a sans serif typeface. Generally, typefaces may be divided into sans serif typefaces and seriffed typefaces, examples of which are illustrated in FIGS. 5A and 5B respectively. Serifs 502 are projections from the stems of letters. A san serif typeface is a typeface that does not include such projections, as illustrated in FIG. 5A, whereas, a seriffed typeface does include such projections. When used, the ideal proportion of serif weight (or thickness) to stem weight is approximately 18%.

Also illustrated in FIG. 4 are top and bottom margins 406, 408, left and right margins 410, 412 and line length 414. In a preferred embodiment, the left and right margins 410, 412 and line length 414 result in approximately 66 characters and spaces per line, with variations depending on the typeface and type size used, as well as other variables known to those having ordinary skill in the art. Furthermore, where the display 404 has a portrait orientation (as shown), all of the margins 406–412 are preferably adjusted to maintain an approximately 3:4 width to height ratio for the page. Of course, different display orientations may require varying ratios as a matter of design choice.

Font size 416 and leading 418 are shown in FIG. 4. In a preferred embodiment, font sizes are limited to be within a range of 10 to 18 points (a point being $1/72$ inch). Leading 418 is described as a percentage of the font size and indicates the amount of vertical space upon which the font is displayed. For example, a 10-point font displayed upon a 12-point space corresponds to 120% leading. However, a 120% leading setting applied to 14-point font leads to a vertical space of 16.8 points. Examples of preferred font size/leading combinations are illustrated in Tables 2 and 3 above. An exemplary indent 420 is also shown in FIG. 4. In a preferred embodiment, indents of one em are used for new paragraphs other than the first line of a chapter. As known in the art, an em, in linear measure, is a distance equal to the type size, and in square measure the square of the type size. Thus an em is 12 pt (or a 12 point square) in 12 point type, and 11 pt (or an 11 pt square) in 11 pt type. Finally, a page number 424 is also illustrated in FIG. 4. Although shown in the lower right-hand corner of the display 404, the location of page numbers 424 is a matter of design choice.

Figure 6:
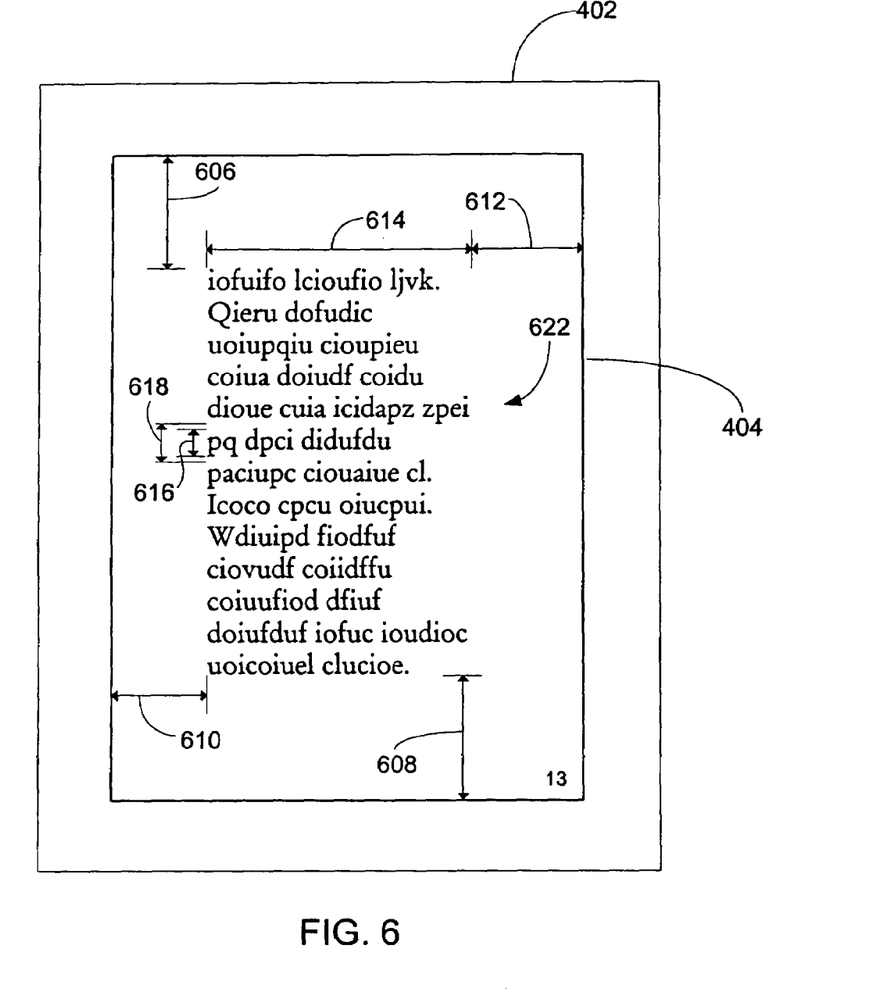
FIG. 6 illustrates modified formatting variables as applied to a document after selection of a new value for a user-modifiable formatting variable.

FIG. 6 illustrates an example of a document 622 after modification of a user-modifiable formatting variable. For example, if the document in FIG. 4 corresponds to a font reference value of "small", the document 622 shown in FIG. 6 is the result of a user changing the font reference value to "large". In addition to a large font size 616 and adjusted leading 618, the text in FIG. 6 is no longer justified and a serifed font is used. Furthermore, the top and bottom margins 606, 608, left and right margins 610, 612 and the line length 614 have been adjusted as well. Although not reflected in FIG. 6, the indents used, as well as the use of hyphenation, may also be adjusted if necessary. In accordance with the present invention, the adjustments to these variables 606–618 are in response to the change in font reference value and are based on optimized formatting values.

Figure 7:
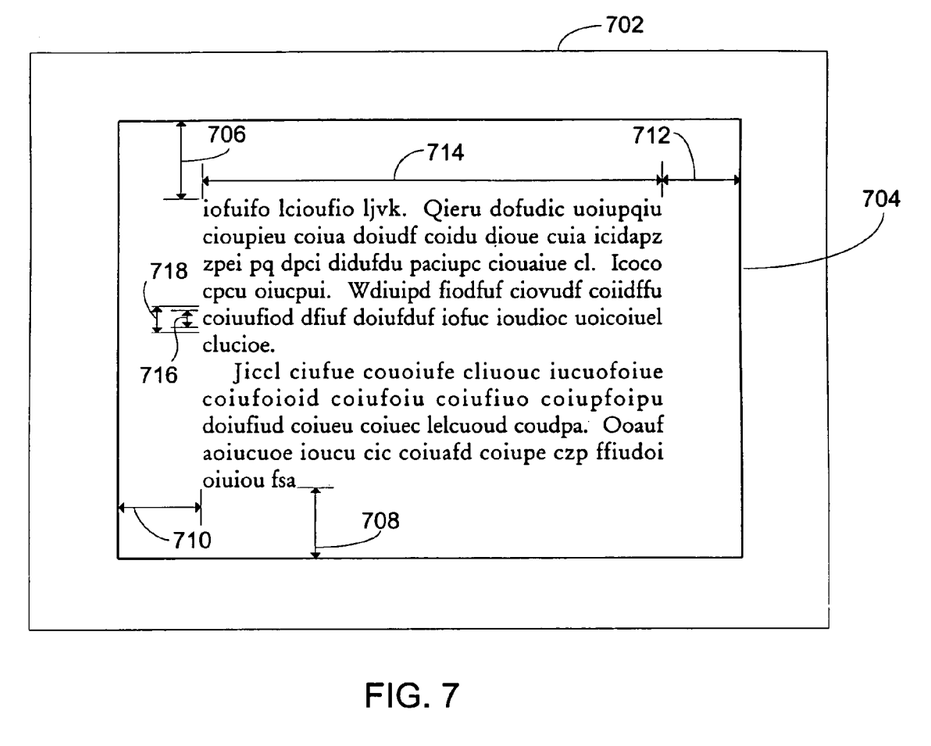
FIG. 7 illustrates modified formatting variables to as applied to a document after selection of a new value for another user-modifiable formatting variable.

FIG. 7 illustrates yet another example of a document after modification of a user-modifiable formatting variable. For example, where the document shown in FIG. 4 corresponds to a display form factor for a portrait orientation, the document illustrated in FIG. 7 is the result of a change in the display form factor to a landscape orientation. Although the housing 702 and display 704 are shown having a landscape orientation, it is understood that this isn't always necessary. That is, the housing 702 itself may have a portrait orientation, whereas the display 704 has a landscape orientation, and vice versa. Regardless, in order to maintain optimal readability, new values for the margins 706–712, line length 714, font size 716 and leading 718 are illustrated. Note that justified text and a serifed font are also incorporated into the document formatting.

The present invention provides a technique for modifying formatting variables in an electronic document based in part upon optimized formatting values. In this manner, maximum readability of electronic documents is ensured regardless of user display preferences. In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

What is claimed is:

1. In a computer-based device, a method for formatting a document for presentation on a display of the computer-based device, wherein format of the document is controlled by a plurality of formatting variables, the method comprising steps of:
    a) receiving user data specifying a value for at least one user-modifiable formatting variable of the plurality of formatting variables the at least one user-modifiable formatting variable including a font reference variable; and
    b) in response to step a) modifying at least a portion of the plurality of formatting variables, other than the variable specified in a), such that the modified variables are optimized for readability;
    wherein the value specified by the user data for the user-modifiable formatting variable comprises a non-numeric large setting and a non-numeric small setting.

2. The method of claim 1, further comprising steps of:
    formatting the document in accordance with the modified formatting variables; and providing the document for presentation on the display.

3. A computer-readable medium having stored thereon computer-executable instructions for performing the steps of claim 2.

4. The method of claim 1, wherein the value specified by the user data for any one of the at least one user-modifiable variable comprises any one of a predetermined set of variable values.

5. The method of claim 1, wherein the value specified by the user data for the font reference variable comprises either a font value of "Large" and a font value of "Small."

6. The method of claim 1, wherein the plurality of formatting variables comprises any of a serif variable, a leading variable, a justification variable and a language variable.

7. The method of claim 6, wherein a value for the leading variable optimized for readability comprises any value within a range of 10 to 20 percent.

8. An apparatus comprising:
    a processor;
    a display coupled to the processor;
    a user interface selection device coupled to the processor; and
    a storage device, coupled to the processor, comprising instructions, executable by the processor, for performing steps of:
        a) receiving user data, via the user interface selection device, specifying a value for at least one user-modifiable formatting: variable of a plurality of formatting variables used to control format of a document for display,
    the at least one user-modifiable formatting variable including a display form factor variable; and
        b) in response to step a) modifying at least a portion of the plurality of formatting variables, other than the variable specified in an such that the modified variables are optimized for readability;
    wherein the value specified by the user data for the display form factor variable comprises one of a plurality of screen resolution settings.

9. The apparatus of claim 8, the storage device further comprising instructions for performing steps of:
    formatting the document in accordance with the modified formatting variables; and
    providing the document for presentation on the display.

10. A handheld display device comprising the apparatus of claim 9.

11. A desktop display device comprising the apparatus of claim 9.

12. The apparatus of claim 8, wherein the value specified by the user data for any one of the at least one user-modifiable variable comprises any one of a predetermined set of variable values.

13. The apparatus of claim 8, wherein the plurality of formatting variables comprises any of a serif variable, a leading variable, a justification variable and a language variable.

14. The apparatus of claim 13, wherein a value for the leading variable optimized for readability comprises any value within a range of 10 to 20 percent.

15. An apparatus comprising:
a processor;
a handheld display coupled to the processor; and
a storage device, coupled to the processor, comprising instructions, executable by the processor, for performing steps of:
   a) receiving a value of a display form factor variable indicative of display characteristics of the display; and
   b) in response to step a) modifying at least a portion of a plurality of formatting variables, other than the display form factor variable specified in a), such that the modified variables are optimized for readability.

16. The apparatus of claim 15, the storage device further comprising instructions for performing steps of:
   formatting the document in accordance with the modified formatting variables; and
   providing the document for presentation on the display.

17. The apparatus of claim 16, wherein the handheld display has a resolution of 240 pixels by 320 pixels.

18. The apparatus of claim 15, wherein the value of the display form factor variable indicates a resolution of the display.

19. The apparatus of claim 15, wherein the plurality of formatting variables comprises any of a font size variable, a font face variable, a serif variable, a headings variable, a leading variable, a line length variable, a left margin variable, a right margin variable, a top margin variable, a bottom margin variable, an indents variable, a hyphenation variable, a justification variable and a language variable.

20. The apparatus of claim 19, wherein a value for the font size variable optimized for readability comprises any value within a range of 10 to 18 points.

21. The apparatus of claim 19, wherein the font face variable optimized for readability specifies either of a sans serif font or a serif font.

22. The apparatus of claim 19, wherein a value for the leading variable optimized for readability comprises any value within a range of 10 to 20 percent.

23. A computer-readable medium having stored thereon a data structure comprising:
   a plurality of formatting variables for use in formatting a document for display via a computer-based display, the plurality of formatting variables comprising at least one user-modifiable formatting variable and a screen resolution variable; and
   optimized formatting values corresponding to at least a portion of the plurality of formatting variables,
   wherein the portion of the plurality of formatting variables is modified, other than the at least one user-modifiable form at variable, based on user specified data for the at least one user modifiable formatting variable, and further based on the screen resolution variable such that the modified variables are optimized for readability.

* * * * *

UNITED STATES PATENT AND TRADEMARK OFFICE
CERTIFICATE OF CORRECTION

| | | |
|---|---|---|
| PATENT NO. | : 6,986,103 B1 | Page 1 of 1 |
| APPLICATION NO. | : 09/456150 | |
| DATED | : January 10, 2006 | |
| INVENTOR(S) | : John L. Beezer et al. | |

It is certified that error appears in the above-identified patent and that said Letters Patent is hereby corrected as shown below:

In column 3, line(s) 16–27, delete "Based on the user data thus specified, at least a portion of the plurality of formatting variables are modified according to corresponding optimized formatting values. The electronic document is then formatted in accordance with the modified formatting variables and provided for display. In a preferred embodiment, the user-modifiable variables comprise a font reference variable (e.g., selecting a small font or a large font) and/or a display form factor variable. In this manner, the present invention allows for user preferences in displaying electronic documents, and yet optimizes readability of such documents despite changes to formatting variables resulting from user preferences." and on line 15 after "variables" insert -- Based on the user data thus specified, at least a portion of the plurality of formatting variables are modified according to corresponding optimized formatting values. The electronic document is then formatted in accordance with the modified formatting variables and provided for display. In a preferred embodiment, the user-modifiable variables comprise a font reference variable (e.g., selecting a small font or a large font) and/or a display form factor variable. In this manner, the present invention allows for user preferences in displaying electronic documents, and yet optimizes readability of such documents despite changes to formatting variables resulting from user preferences. --.

In column 10, line 47, in Claim 8, after "formatting" delete ":".

In column 10, line 54, in Claim 8, delete "an" and insert -- a), --, therefor.

In column 12, line 28, in Claim 23, delete "form at" and insert -- formatting --, therefor.

Signed and Sealed this

Twenty-eighth Day of July, 2009

JOHN DOLL
*Acting Director of the United States Patent and Trademark Office*